(12) United States Patent
Wehkamp

(10) Patent No.: US 8,510,733 B2
(45) Date of Patent: Aug. 13, 2013

(54) MANAGEMENT OF A GRID COMPUTING NETWORK USING INDEPENDENT SOFTWARE INSTALLATION PACKAGES

(75) Inventor: Rainer Wehkamp, Tampere (FI)

(73) Assignee: Techila Technologies Oy, Tampere (FI)

( * ) Notice: Subject to any disclaimer, the term of this patent is extended or adjusted under 35 U.S.C. 154(b) by 827 days.

(21) Appl. No.: 12/063,205

(22) PCT Filed: Aug. 4, 2006

(86) PCT No.: PCT/FI2006/050350
§ 371 (c)(1),
(2), (4) Date: Jul. 20, 2010

(87) PCT Pub. No.: WO2007/017557
PCT Pub. Date: Feb. 15, 2007

(65) Prior Publication Data
US 2010/0287543 A1  Nov. 11, 2010

(30) Foreign Application Priority Data
Aug. 8, 2005  (FI) ..................................... 20055429

(51) Int. Cl.
*G06F 9/445* (2006.01)
*G06F 15/16* (2006.01)
*G06F 15/173* (2006.01)

(52) U.S. Cl.
USPC ........... 717/177; 717/174; 717/176; 709/203; 709/223

(58) Field of Classification Search
USPC ......... 717/120–123, 168–178; 709/201–203, 709/223–226
See application file for complete search history.

(56) References Cited

U.S. PATENT DOCUMENTS

| | | | | |
|---|---|---|---|---|
| 5,960,204 A | * | 9/1999 | Yinger et al. ................. | 717/176 |
| 6,289,512 B1 | | 9/2001 | Edwards et al. | |
| 6,397,381 B1 | * | 5/2002 | Delo et al. .................... | 717/174 |
| 6,585,779 B1 | * | 7/2003 | Becker .......................... | 715/237 |
| 6,675,382 B1 | * | 1/2004 | Foster ........................... | 717/177 |
| 7,010,596 B2 | * | 3/2006 | Bantz et al. ................... | 709/224 |
| 7,171,470 B2 | * | 1/2007 | Doyle et al. .................. | 709/225 |
| 7,409,676 B2 | * | 8/2008 | Agarwal et al. .............. | 717/120 |
| 7,441,241 B2 | * | 10/2008 | Dawson et al. ............... | 718/102 |
| 7,458,073 B1 | * | 11/2008 | Darling et al. ................ | 717/168 |
| 7,461,374 B1 | * | 12/2008 | Balint et al. .................. | 717/174 |
| 7,478,385 B2 | * | 1/2009 | Sierer et al. .................. | 717/174 |
| 7,516,221 B2 | * | 4/2009 | Souder et al. ................ | 709/226 |
| 7,594,015 B2 | * | 9/2009 | Bozak et al. ................. | 709/226 |

(Continued)

OTHER PUBLICATIONS

Buyya et al., "Nimrod/G: An Architecture for a Resource Management and Scheduling System in a Global Computational Grid," 2000, IEEE, p. 283-289.*

(Continued)

*Primary Examiner* — Qing Chen
(74) *Attorney, Agent, or Firm* — Perman & Green, LLP

(57) ABSTRACT

A grid computing network including a server node and several client nodes, of which at least one client node includes a core program to manage the computing modules of the client node, the computing modules being coded as data bundles including independent packages, the packages being executable by the core program independently. The core program is also coded as a data bundle including individual packages, wherein one single package of the computing module or the core program can be activated for other computing modules of the client node for the computing task of the computing module.

13 Claims, 3 Drawing Sheets

(56) References Cited

U.S. PATENT DOCUMENTS

| | | | | |
|---|---|---|---|---|
| 7,603,404 | B2* | 10/2009 | Gebhart et al. | 709/201 |
| 7,631,069 | B2* | 12/2009 | Bozak et al. | 709/224 |
| 7,673,054 | B2* | 3/2010 | Bozak et al. | 709/228 |
| 7,680,933 | B2* | 3/2010 | Fatula, Jr. | 709/226 |
| 7,761,557 | B2* | 7/2010 | Fellenstein et al. | 709/224 |
| 7,765,552 | B2* | 7/2010 | Miller et al. | 718/104 |
| 7,810,090 | B2* | 10/2010 | Gebhart | 717/176 |
| 2004/0003077 | A1* | 1/2004 | Bantz et al. | 709/224 |
| 2004/0019596 | A1 | 1/2004 | Taylor et al. | |
| 2004/0167980 | A1* | 8/2004 | Doyle et al. | 709/225 |
| 2004/0215590 | A1* | 10/2004 | Kroening | 707/1 |
| 2004/0250246 | A1* | 12/2004 | Veselov et al. | 717/169 |
| 2004/0255291 | A1* | 12/2004 | Sierer et al. | 717/174 |
| 2005/0027785 | A1* | 2/2005 | Bozak et al. | 709/200 |
| 2005/0027865 | A1* | 2/2005 | Bozak et al. | 709/226 |
| 2005/0038834 | A1* | 2/2005 | Souder et al. | 707/203 |
| 2005/0044251 | A1* | 2/2005 | Bozak et al. | 709/230 |
| 2005/0131898 | A1* | 6/2005 | Fatula | 707/8 |
| 2005/0138618 | A1* | 6/2005 | Gebhart | 717/176 |
| 2005/0149712 | A1 | 7/2005 | Martinez et al. | |
| 2005/0160413 | A1* | 7/2005 | Broussard et al. | 717/148 |
| 2005/0172306 | A1* | 8/2005 | Agarwal et al. | 719/328 |
| 2005/0262506 | A1* | 11/2005 | Dawson et al. | 718/100 |
| 2006/0005181 | A1* | 1/2006 | Fellenstein et al. | 717/174 |
| 2006/0064698 | A1* | 3/2006 | Miller et al. | 718/104 |
| 2006/0136883 | A1* | 6/2006 | Gebhart et al. | 717/140 |
| 2006/0150158 | A1* | 7/2006 | Fellenstein et al. | 717/126 |
| 2006/0168584 | A1* | 7/2006 | Dawson et al. | 718/104 |
| 2006/0195559 | A1* | 8/2006 | Winter et al. | 709/223 |
| 2006/0294238 | A1* | 12/2006 | Naik et al. | 709/226 |

OTHER PUBLICATIONS

Figueiredo et al., "A Case for Grid Computing on Virtual Machines," 2003, IEEE.*

He et al., "Forming Resource-Sharing Coalitions: A Distributed Resource Allocation Mechanism for Self-Interested Agents in Computational Grids," Mar. 2005, ACM, p. 84-91.*

Vargas et al., "Application Partitioning and Hierarchical Management in Grid Environments," 2004, ACM, p. 314-318.*

Tran et al., "Grid Resource Management Based on Functional Dependency," 2006, IFIP, p. 365-374.*

Fedak G et al: "Xtremweb: a generic global computing system", Cluster Computing and the Grid, 2001. Proceedings. First IEEE/ACM International Symposium on May 15-18, 2001, Piscataway, NJ, USA, IEEE, (May 15, 2005), pp. 582-587, ISBN:0-7695-1010-8/1.

Bailey E C: "Maximun RPM- Taking the Red Hat Package Manager to the Limit", Internet Citation [online] Jun. 1998, pp. I-XXIV, 1-92, 125-137, 165-216, 251-265, XP002406989, URL: http://www.rpm.org/local/maximum-rpm.ps.gz.

Franken K: "Using RPM-SuperVisor, v. 1.11" Internet Citation (Nov. 6, 2001), XP002289340, URL: http:/www.klaus.franken.de/rpmsv/download/rpmsv.pdf.

Coddington P D et al: "Extensible Job Managers for Grid Computing", Internet Citation [online] Feb. 2003, XP002375558, URL: http://www.cs.adelaide.edu.au/users/darren/files/acsc03.pdf [retrieved on Apr. 4, 2006].

The Open Services Gateway Initiative, "Framework Specification Version 1.1", Oct. 2001, pp. '11-282'-'20-282' OSGi Service-Platform Release.

Yuan: "From Headless to Rich UI", May 2004, 9 pages, [online] URL: http://www.ddj.com/dept/architect/184415140.

European Office Action dated Jul. 15, 2010.

Cancio G et al: "Software Package Management and Distribution Design", DATAGRID, Feb. 13, 2003, pp. 1-12, XP007913825.

Cancio G et al: "EDMS Document Information Page", Feb. 12, 2003, XP007913822.

Wilson, Robert J., "The European DataGrid Project", Institut de Fisica d'Altes Energies, Barcelona, Spain and Colorado State University, Fort Collins, Colorado, USA, Oct. 22, 2001, pp. 1-3, XP007913824.

Akshay Luther. Rajkumar Buyya, Rajiv Ranjan, and Srikumar Venugopal, Alchemi: A. NET-based Grid Computing Framework and its Integration into Global Grids, Technical Report, GRIDS-TR-2003-8, Grid Computing and Distributed Systems Laboratory, University of Melbourne, Australia, Dec. 2003, 17 pages.

* cited by examiner

MANAGEMENT OF A GRID COMPUTING NETWORK USING INDEPENDENT SOFTWARE INSTALLATION PACKAGES

CROSS-REFERENCE TO RELATED APPLICATIONS

This application is the National Stage of International Application No. PCT/FI2006/050350, International Filing Date, Aug. 4, 2006, which designated the United States of America, and which international application was published under PCT Article 21(2) as WO Publication No. WO 2007/017557 and which claims priority from Finnish Application No. 20055429, filed Aug. 8, 2005.

BACKGROUND

1. Field

The disclosed embodiments relate to grid networks, especially to the management of a computing network implemented as a grid network.

2. Brief Description

The grid network is a distributed system, which distributes computing and data resources via a wide area network (WAN), for example through the Internet. Thus, the grid network enables combined and shared use of data networks, computers, databases and scientific instruments owned and managed by a number of different organizations.

The grid computing network is the most common embodiment of the grid network. In the grid computing network the computing tasks are performed between several client machines as a distributed batch run. The grid computing network is typically composed of at least one server node that controls the computation, and typically of several client nodes, each of them performing a determined part of the computation. The client nodes can be grouped separately into one or several client node clusters or groups, wherein for example the client nodes (i.e. individual computers) participating in the grid network of one organization, such as a university can form one cluster. The cluster typically comprises a front-end node that controls the computation in the client nodes of the cluster, as well as a maintenance node by means of which the administrators of the cluster and the server node can update the software and computing routines of the client nodes.

The intelligence of the grid computing network is primarily implemented by means of a so-called intermediate software that functions as an application layer connecting the nodes and converts the commands of computing applications in such a form that can be understood by the devices. Thus, servers and computers equipped with different operating systems can be made to operate in the same environment. Typically, in the grid computing network the input data of the computing and the computing application in use are transferred to a client node by means of intermediate software, which client node utilizes a core program of its own intermediate software to install and update the computing application, performs the computing on the basis of the input data and transmits the results to a server node after the computing.

Thus, in the client node the computing takes place by means of the core program of the intermediate software and the computing application, said computing application typically comprising one or several computing modules designed for specific computing routines. The loading and updating of the core software and computing applications has traditionally been one of the bottlenecks in the use of grid computing networks, and different kinds of intermediate software architectures have been developed to solve them.

One intermediate software architecture is known by the name UNICORE, which architecture, unlike most other intermediate software architectures, determines a highly integrated grid computing environment in which the compulsory software components of both the server nodes and the client nodes have been specified with precision. UNICORE is a Java™ platform based application utilizing Java™ platform run-time properties to update the computing modules. UNICORE comprises a so-called plugin mechanism, by means of which it is possible to add and update the computing modules in the client nodes during the run without having to update the core software itself. The UNICORE server node comprises a job preparation agent (JPA) for the computation tasks that provides a graphic user interface by means of which a user having administrator rights can determine the plugin module to be transmitted to a specific client node, which plugin module is automatically installed. More specific description of the UNICORE system, as well as other intermediate software architectures can be found in the address www.enacts.org/gridenabling.pdf.

Although the highly integrated UNICORE architecture is perhaps the most sophisticated intermediate software in view of updating the computing modules, it contains several deficiencies. Although the plugin-mechanism enables automatic updating of the computing modules in the client node, the maintainer of computing must, however, always determine the dependencies of the computing modules on the core software and other computing modules. The application programming interface API of UNICORE sets rather strict limitations to the way in which the plugin (i.e. the computing module) can use the core software and other computing modules. Furthermore, the automatic updating of the plugin mechanism only functions in computing modules; in order to update the core software itself it is necessary to interrupt all runs in the client node.

SUMMARY

Now, an improved arrangement has been developed to reduce the above-mentioned problems. As different aspects of the disclosed embodiments, we present a grid computing network, a method for maintaining a grid computing network, a client node for a grid computing network and a computer program product, which are characterized in what will be presented in the independent claims. The dependent claims disclose advantageous embodiments of the disclosed embodiments.

The disclosed embodiments are based on the idea that computing modules are coded in a suitable manner as data bundles comprising independent computing packages. The data bundle forming the computing module also comprises a file that determines the other components necessary for executing said computing module. The data bundle forming the computing module can thus use the computing packages of other computing modules. Furthermore, the core program of the intermediate software of the client node is also coded as a data bundle in a corresponding manner, said data bundle comprising different control packages relating to the control of the computing. Thus, it is possible to activate a single package from another data bundle, in other words from another computing module or core program, wherein said computing component does not have to be retrieved from the server. However, a further idea of the disclosed embodiments is to transmit computing data and information on a computing module necessary in the computing task of said computing data to the client nodes as non-bundled data in order to simplify the implementation in the client nodes and to save network resources.

Thus, as a first aspect of the disclosed embodiments we present a grid computing network comprising a server node and several client nodes, of which at least one client node comprises a core program to manage the computing modules of the client node, wherein said computing modules and core program are coded as data bundles comprising independent packages, said packages being executable by the core program independently such that a single package of the computing module or the core program can be activated into other computing modules of the client node for the computing task of said computing module, and the server node is arranged to transmit computing data and information on at least one computing module necessary in the computing task of said computing data to the client nodes as non-bundled data.

According to an embodiment, the server node is arranged to transmit the information on the at least one necessary computing module together with the computing data.

According to an embodiment, the server node is arranged to transmit the information on the at least one necessary computing module separately from the computing data, wherein the said information includes identification data of the computing data.

According to an embodiment, the client node is arranged to update any missing package necessary in the computing task of said computing data by activating said packages from another client node or server node.

According to one embodiment, the data bundle forming the computing module also comprises a file that determines the other components necessary for executing said computing module.

According to one embodiment, the functionalities of the grid computing network are determined in a Java™ platform based environment, in which the data bundles have been coded as JAR files, and the packages they comprise are executed in a Java™ virtual machine.

By means of the disclosed embodiments and its various embodiments it is possible to attain several advantages. Because the computing module already contains information coded therein on the components required by the computing module to function, it is possible to establish the necessary dependencies to the missing components in the client node, i.e. the computing maintenance server only transmits the computing module to the client node and it does not have to be aware of other computing nodes or their packages in the client node. Yet another advantage is that the packages retrieved for the client node in connection with the installation of the computing module can be utilized to bind the dependencies of subsequent computing modules, and it is also possible to utilize packages provided by earlier computing modules. Thus, the reuse of the same code considerably reduces the transfer of files from the server to the client node, which reduces the loading of the network. This is further underlined by the idea of transmitting the computing data and the information on a computing module necessary in the computing task of said computing data to the client nodes as non-bundled data, whereby the client node can easily conclude the necessary computing modules and possibly reuse some of computing modules already downloaded. On the other hand, no error-prone and power consuming translation of the computing data back and forth from the Java™ platform is required.

Yet another advantage is that because the version dependencies of the packages of the computing module have been coded directly in the computing modules, which dependencies can be interpreted and updated by the core program automatically, the installation of the necessary package versions becomes substantially easier due to the automatic process, and the number of human errors is correspondingly reduced. Because the intelligence of the system in view of the dependencies of the computing modules and reuse of the packages has been shifted largely to the client nodes, it is thus also possible to save the resources of the server node. Furthermore, when outdated computing modules are removed from the client node, the system advantageously ensures that the packages to which active references exist are not accidentally removed, which ensures undisturbed continuation of other computing processes. Thus, it is also possible to avoid reloading of the same package from the server. Another significant advantage is that because the core program of the client node can also be updated during the run similarly to the computing modules, it is not necessary to interrupt the computing in the client node for the duration of updating the core program.

Another aspect of the disclosed embodiments is a method for managing a grid computing network, which grid computing network comprises a server node and several client nodes, of which at least one client node comprises a core program for managing the computing modules of the client node, said computing modules and the core program are coded as data bundles comprising independent packages, which packages are independently executable by the core program such that a single package of the computing module or the core program can be activated into other computing modules of the client node for the computing task of said computing module; the method comprising: receiving, in the client node, computing data and information on at least one computing module necessary in the computing task of said computing data from the server node as non-bundled data; updating said at least one computing module in the client node; checking, from a file contained in the computing module, whether other components are determined necessary for executing said computing module; and activating the packages determined as necessary components from other computing modules of the client node or the core program for the computing task of said computing module.

As a third aspect of the disclosed embodiments we present a client node of a grid computing network comprising: a core program for managing the computing modules of a client node; means for loading a computing module into a client node, said computing module and core program being coded as data bundles comprising independent packages, which packages are independently executable by the core program such that a single package of the computing module or the core program can be activated into other computing modules of the client node for the computing task of said computing module; the client node further comprising means for receiving computing data and information on at least one computing module necessary in the computing task of said computing data from the server node as non-bundled data.

As a fourth aspect of the disclosed embodiments we present a computer program product, which is stored in a computer-readable medium and which can be executed in a data processing device to manage computing modules of a client node in a grid computing network, said computer program product comprising a software code portion for loading a computing module in the client node, the computing module being independently executable by the computer program product such that a single package of the computing module or the computer program product can be activated into other computing modules of the client node for the computing task of said computing module; said computer program product further comprising a software code portion for receiving computing data and information on at least one computing module necessary in the computing task of said computing data from the server node as non-bundled data.

BRIEF DESCRIPTION OF THE DRAWINGS

The disclosed embodiments will now be described in more detail in connection with preferred embodiments with reference to the appended drawings, in which.

DETAILED DESCRIPTION OF THE EMBODIMENTS

Figure 1:
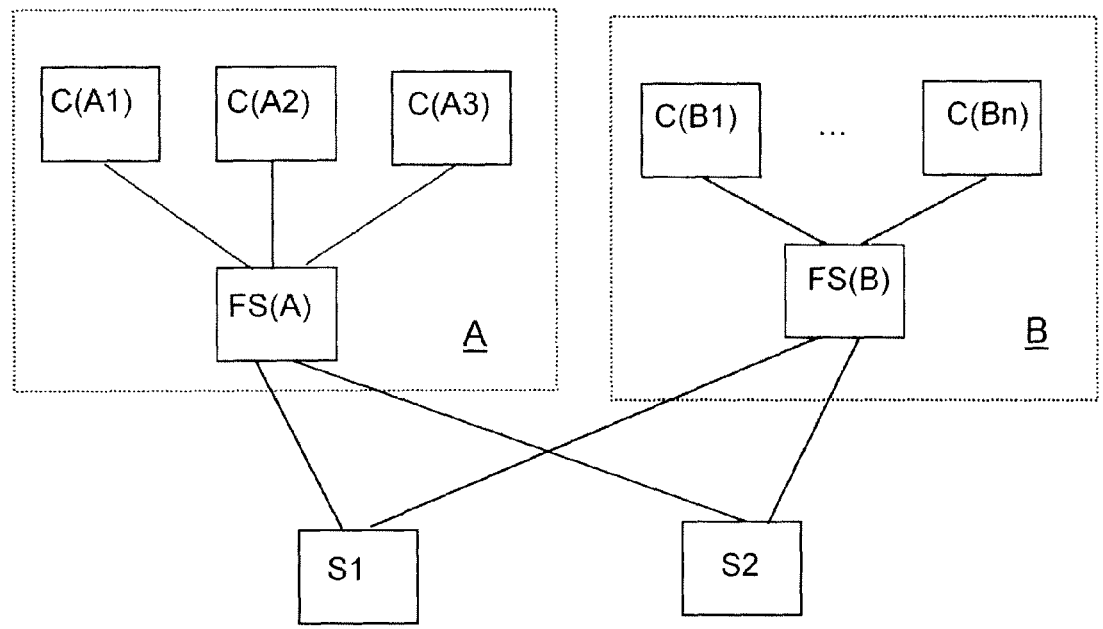
FIG. 1 shows a general model of a grid computing network in a reduced block diagram.

FIG. 1 shows a general model of a grid computing network by means of a reduced block diagram. FIG. 1 illustrates two server nodes S1, S2, which can both execute and control their own computing tasks in a distributed manner in the grid computing network of FIG. 1. Furthermore, FIG. 1 presents two client node clusters A and B, which can be for example computers and/or servers maintained by two different organizations, such as a university A and a research institute B. FIG. 1 shows both clusters comprising a front-end node FS(A) and FS(B) that controls the computation in the client nodes of the cluster and facilitates the control of the client nodes in view of the organization in question. However, it is obvious for a person skilled in the art that the implementation of the grid computing network does not require a separate front-end node, but the server nodes can also communicate directly with the client nodes.

FIG. 1 presents three client nodes C(A1), C(A2) and C(A3) in the cluster A. Correspondingly, for the sake of clarity, an indefinite number of client nodes (C(B1)-C(Bn)) have been presented in the cluster B to illustrate the fact that the number of client nodes in the grid computing network is in no way restricted, and neither is the number of server nodes. For heavy computing tasks it is thus possible to create a grid computing network comprising thousands of client nodes between which the computing is distributed.

Figure 2:
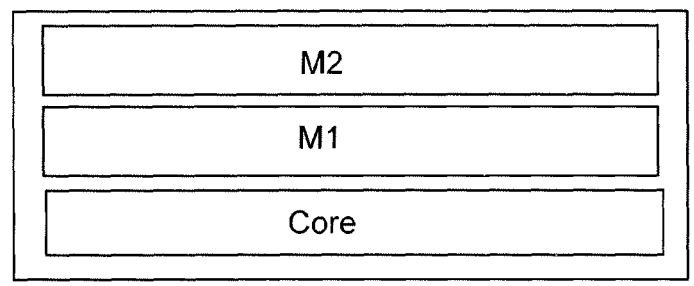
FIG. 2 illustrates the functional blocks of a client node on a general level.

FIG. 2 describes the functional blocks of the client node on a general level. The client node C comprises a core program (Core) of intermediate software complying with the intermediate software architecture in use, which installs and updates the computing application and controls the computing, and typically also several computing modules (M1, M2). Typically, each computing module comprises a software code in order to perform certain predetermined computing routine or routines.

The size of the computing modules may be several hundreds of kilobytes, even several megabytes. The updating of such computing modules from the server node for example in a grid computing network comprising 500 client nodes takes place very slowly and causes huge loading on the network in several network interfaces.

Thus, as an aspect of the disclosed embodiments we present a grid computing network in which for instance the updating of computing modules is considerably facilitated. In such a grid computing network the server node transmits computing modules to the client node, said computing modules being coded in a suitable manner as data bundles comprising computing packages, in other words computing routines, algorithms, raw data, library files, etc. The data bundle forming the computing module also typically comprises a file that determines other components necessary for executing said computing module. The data bundle forming the computing module can freely hand over its computing packages in the use of other computing modules (so-called export function), and correspondingly, it can use the computing packages of other computing modules (so-called import function). Furthermore, the core program of the intermediate software of the client node is also coded as a data bundle in a corresponding manner, said data bundle comprising different management packages relating to the control of computing. Thus, it is possible to activate a single package from another data bundle into the computing module, in other words from another computing module or core program, and in a corresponding manner, it is possible to update the core program of the client node automatically only for the necessary packages by activating said packages from another client node or server node.

The implementation of such a grid computing network requires a suitable application platform that enables coding of data bundles comprising packages in such a manner that the data bundles can activate packages of each other. According to one embodiment the functionalities of the grid computing network are determined in a Java™ platform based environment, in which the data bundles have been coded as JAR files (Java™ Archive files), and the packages they comprise are run in a Java™ virtual machine (JVM). All the application components relating to the computing are most advantageously run in the same Java™ virtual machine, which saves memory and processor capacity.

According to one embodiment the functionalities of the grid computing network can be determined in a Microsoft™ .NET based environment, which provides functionalities corresponding to the Java™ platform. However, the Microsoft™ .NET application platform sets such a limitation that the client nodes can only be devices based on the Windows™ operating system, whereas the Java™ platform also enables the use of devices based on other operating systems, such as the Linux®, Unix®, Mac® and OS X® operating systems in the grid computing network.

In a Java™ platform based environment where the data bundles have been coded as JAR files, it is advantageously possible to utilize a Manifest file belonging to each JAR file according to the Java™ platform specifications, to determine other components necessary for executing said computing module. These other components must also be available either in other computing modules or in the core program of the client node, in other words, the other components are always packages of data bundles. If the packages determined as said packages are not available directly in other computing modules or in the core program, the core program of the client node retrieves the necessary packages from the server node. The Manifest file comprises an "Import-Package" field, which is used for naming these components. The name and version number of the packages is determined in the "Import-Package" field. Correspondingly, the Manifest file comprises an "Export-Package" field indicating the names and version numbers of the packages offered by said computing module in the use of other computing modules.

Although the system is advantageously implemented in a Java™ platform based environment, in which data bundles are coded as JAR files, the packages of the data bundles can also comprise non-Java™ platform components. This is especially advantageous in grid computing in particular, because software and computing data used in client nodes to perform the scientific computing itself are often programmed with certain programming languages especially suitable for computing, such as Fortran. Because it is often difficult to translate such programming languages into the Java™ programming language, it is possible to transfer data directly applicable in the computing in the packages of the data bundles, for example as a binary file.

In a preferred embodiment, the computing data and the information on the computing module(s) necessary in the computing of this particular computing data are transmitted from the server node to the client nodes as non-bundled data. This non-bundled data can preferably be transmitted to the client nodes without any computing module in the beginning, whereby the client node can easily conclude the necessary computing modules, on one hand, and no error-prone and power consuming translation of the computing data back and forth from the Java™ platform is required, on the other hand. Once the client node has concluded, which computing modules it should use, it can then start the process of updating its computing modules, if necessary, and when the necessary computing modules and packets are activated, it can start the actual computing process.

According to an embodiment, the information on the necessary computing module(s) is transmitted together with the computing data packet, e.g. as a common binary file including a particular field for the information on the necessary computing module(s). This information preferably includes the name of the necessary computing module(s), its type identifier (e.g. as an integer value), a network address wherefrom to retrieve the module(s), if necessary (e.g. as an URL address), and a version number(s) of the necessary computing module(s).

According to an embodiment, the information on the necessary computing module(s) is transmitted separately from the actual computing data packet. Thereby, the computing data packet sent to a client node includes only a name or other identifier of the computing data packet. Then the client node inquires the server node for further information on how to compute this particular computing data packet. The server node acknowledges the inquiry by sending the information relating to the necessary computing module(s) to the client node, which then retrieves the necessary module(s).

According to an embodiment, the server node may instruct the client node to operate in a particular mode, whereby the client node updates its computing modules to correspond those required in this particular mode. Thereafter, the client node computes all the computing data packets received from the server node with these computing modules, until the server node instructs the client node to change into another mode. This kind of computing management may be useful in the beginning of a large project upon selecting the client nodes for the project. On the other hand, this also complicates the computing management somewhat, since the server node must update information about each client node and the mode they are currently using. Furthermore, the server node must also instruct the client nodes to change their mode at a right time.

The above embodiment of the client nodes operating in particular mode can also implemented such that the server node directly sends one or more computing modules to a client node and instructs the client node to use these computing modules in computing all the computing data packets it receives from the server node. Again, the client node computes all the computing data packets received from the server node with these computing modules, until the server node send new computing module(s), i.e. instructs the client node to change into another mode.

Naturally, it is possible to bundle the computing data packet and the necessary computing module(s) into a common data bundle and send it to the client nodes. Then the client node carries out the computing of the computing data with the received computing module(s) and returns the results to the server node. However, this kind of computing management is remarkably inefficient in view of network resources, if implemented in a larger scale, e.g. if the computing data packet is always transmitted as bundled data.

The version management of packages constitutes an important part in the updating of packages. The starting point has to be that a package having a smaller or similar version number is always compatible with a package having a larger version number.

When a new computing module is loaded in the client node to be taken in use, the core program of the client node receives the computing module and installs it in the computer. Before the computing module can be taken in use, its dependencies must be analyzed for example from a Manifest file. The computing module may need both packages and services of the system level and packages and services contained in other computing modules. The core software binds the other necessary components in the computing module by means of the import function, whereafter the computing module can be activated.

The installation and uninstallation of the computing module may be implemented without interrupting the processes currently running in other computing modules independent of said computing module. Thus, the computing module may offer packages of its own in the use of other computing modules by means of the export function. When the installation of the computing module is removed, the dependencies of the packages offered in the use of other computing modules are checked, and the removal of packages having export dependencies is prevented for as long as other computing modules are dependent of said packages. Thus, it is possible to ensure continuing function of other computing modules.

By means of the update function of the core program it is possible to update the dependencies of the packages either in view of other computing modules or version numbers. The update function can also be used when removing the installation of a computing module from a client node, wherein the dependencies of the packages offered in the use of other computing modules by means of the export function are first checked, and the processes of computing modules relating to the dependencies are interrupted, whereafter the dependencies of said packages are updated and their processes are started again. Due to this arrangement, the dependencies between the components remain updated automatically.

Similarly, it is also possible to update the core program of the client node without interrupting the computing processes running at a given time. It is possible to install new packages in the core software or to update outdated packages with new versions. When packages of the core software are being removed, the dependencies between the packages are first checked, i.e. their effect on the computing processes on the run, and if such dependencies are discovered, the computing process is terminated before the package is removed.

One distributed service platform model utilizing the Java™ JAR files and the run-time properties of a virtual machine is a OSGi® (Open Services Gateway Initiative) platform that determines a standardized model to manage network services. According to one embodiment, the above-described installation and update functions of the computing modules can be harmonized with the OSGi® platform standard. This, however requires the formation of various OSGi® platform compatible service registers and security management mechanisms, which is not essential in view of implementing the disclosed embodiments.

Figure 3:
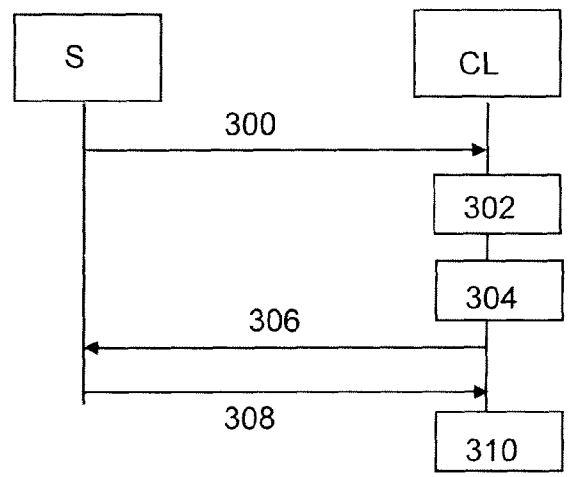
FIG. 3 shows a signalling chart of an embodiment of the disclosed embodiments.

Different embodiments of the disclosed embodiments will be presented hereinbelow by means of examples. FIG. 3 describes by means of a signalling chart an example of installing a computing module in a client node. The starting point of the example is a situation typical for grid computing, in which a client node CL is released to perform computing tasks and reports this to a server S. The server S transmits computing data to the client node CL, which computing data also contains information on the computing modules necessary in the computing. Thus, it is discovered that the computing module M1 necessary in the computing is missing from the client node, and in this case the core software of said client node CL requests said computing module from the server.

The server S transmits (300) the computing module M1 to the client node CL, and the core software of said client node installs (302) said computing module. Before the computing module M1 can be activated, the core software checks (304) the dependencies of the computing module on other packages from a Manifest file of the computing module M1 In this context it is discovered that in order to function the computing module M1 requires packages com.company.service.log and com.company.ssl. These packages cannot be found in the register of the client node CL itself, wherein the client node CL transmits a request (306) on said packages to the server. The server S transmits (308) the requested packages in JAR files to the client node CL, which installs (310) them. Thereafter the dependencies in the computing module M1 are in order, and the computing module M1 can be activated.

The above-described example illustrates the ease of installing the computing module according to the disclosed embodiments: the computing module already contains information coded therein on the components required by the computing module to function, and it is the task of the client node to establish the necessary dependencies to the missing components, i.e. the computing maintenance server only transmits the computing module to the client node and it does not have to be aware of the other computing nodes or their packages in the client node.

Figure 4:
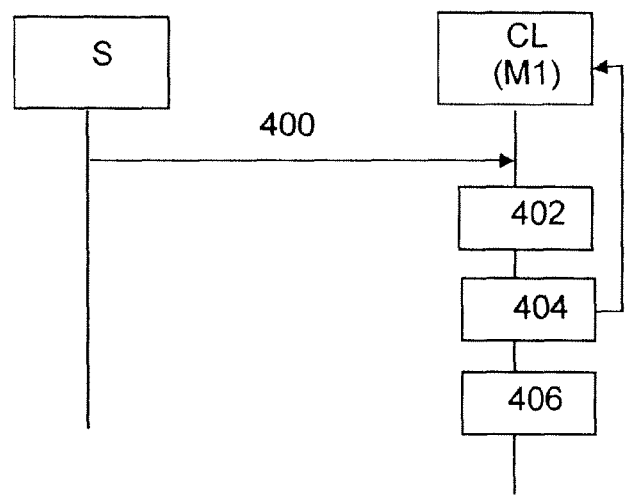
FIG. 4 shows a signalling chart of an embodiment of the disclosed embodiments.

FIG. 4 describes by means of a signalling chart an example of offering the packages of the computing module in the use of another computing module (so-called export function). The starting point in FIG. 4 is the end of the preceding example, i.e. a computing module M1 has been installed in the client node CL, which computing module in this example also comprises a computation algorithm com.company.service.nqueen. Thus, the computing module M1 can hand over its services in the use of other computing modules by means of the export function, wherein said services are automatically added in the register of the client node CL as services.

The server S transmits (400) the computing module M1 to the client node CL, and the core software installs (402) said computing module again. The dependencies of the computing module M2 on other packages are checked (404) from a Manifest file of the computing module, wherein it is discovered that in order to function, the computing module M2 also requires packages com.company.service.log and com.company.ssl. However, these packages have already been installed in the client node CL simultaneously with the installation of the computing module M1, wherein it is not necessary to retrieve them from the server. Further, it is discovered that in order to function the computing module M2 also requires the algorithm com.company.service.nqueen. Because the computing module M1 has reported said algorithm as an export service in the register of the client node CL, it is possible to take the algorithm com.company.service.nqueen in use (406) directly in the computing module M2. Thus, in this case a service provided by another computing module is used.

This example illustrates the advantages attained inside the client node by the act of determining the dependencies of the packages automatically. The packages retrieved in the client node in connection with the installation of the preceding computing module can thus be utilized when binding the dependencies of subsequent computing modules, and it is also possible to utilize the export services of preceding computing modules. The reuse of the same code considerably reduces the transfer of files from the server to the client node, which reduces the loading of the network.

Figure 5:
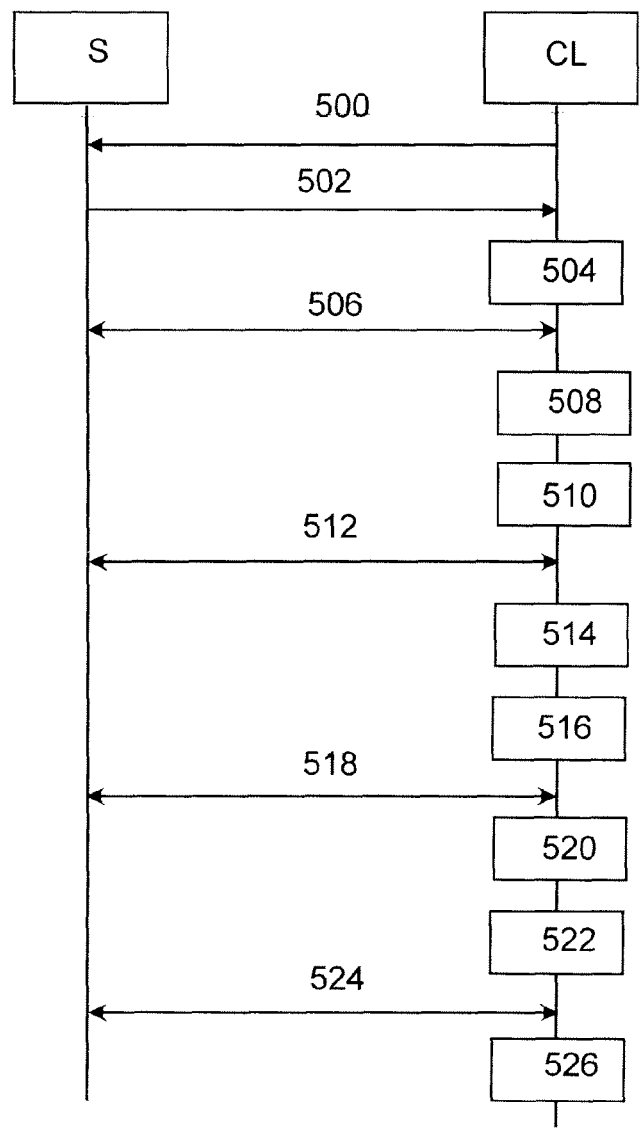
FIG. 5 shows a signalling chart of an embodiment of the disclosed embodiments.

FIG. 5 describes by means of a signalling chart an example of the automatic version management of computing module packages. A client node CL is activated and it informs (500) a server S that it is available for computing tasks. The server notices that the most urgent tasks are in line in the module M3, and informs (503) the client node CL that it must compute a task in the computing module M3. Because the module M3 is not yet installed in the client node CL, the client node requests (504) the core software to install said computing module. The core software (506) loads the computing module M3 from the storage of the server S and installs (508) the same.

The core software reads (510) the dependencies of the computing module M3 on other packages from a Manifest file, wherein it is discovered that the computing module M3 also requires a package com.company.foo.FFT and version 1.1.0 in particular. Said package is already installed in the client node CL, but its version number is 1.0.0. The core software discovers that the package must be updated and loads (512) a new version of the package from the storage of the server S and installs (514) the same. Similarly to the installation of the module M3, the core software now reads (516) the dependencies of the package com.company-.foo.FFT and discovers that now the new version of the package com.company.foo.FFT also requires a package com.company.foo.SSE, version 1.0.0, which is not installed in the client node CL yet. Now the core software loads (518) a new version of the package com.company.foo.SSE from the storage of the server (S), installs (520) the same and checks (522) its dependencies again. Thus, it is discovered that the package com.company.foo.SSE is not dependent on others. As all the dependencies have now been fulfilled, the computing module M3 is ready for use. Now the client node CL retrieves (524) computing data from the server S and requests (526) the computing module M3 to perform the computing.

This example illustrates the advantages attained on one hand by the coding of the version dependencies of the computing module packages directly into the computing modules, and on the other hand by the intelligence in interpreting and updating these dependencies automatically. The installation of the necessary package versions becomes substantially easier due to the automatic process, and the number of human errors is correspondingly reduced. In the above-described action it is not necessary for the maintainer of computing to determine the dependencies of the computing modules after the coding of the computing module is finished.

Figure 6:
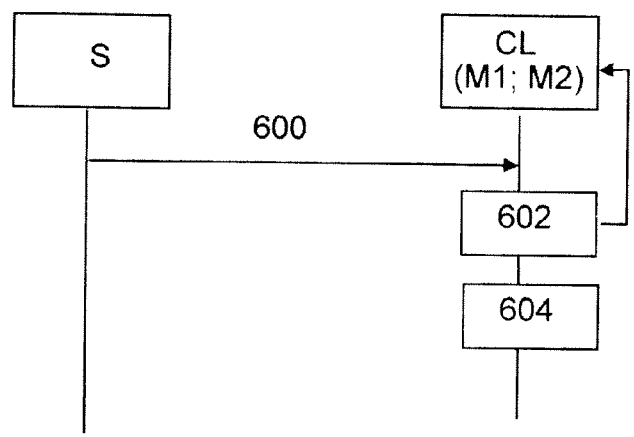
FIG. 6 shows a signalling chart of an embodiment of the disclosed embodiments.

FIG. 6 describes by means of a signalling chart an example of removing a computing module from a client node. The starting point in FIG. 6 lies in the examples according to FIGS. 3 and 4, in which computing modules M1 and M2 have been installed in the client node CL, of which M1 also comprises a computing algorithm com.company.service.nqueen, which is also in use in M2 as an export package.

The system administrator wishes to remove outdated, unused computing modules and their packages from the client node. The system administrator discovers that the first installed computing module M1 is outdated and transmits (600) an order to the client node CL to remove the same. The core software checks (602) the register of the client node CL to ensure that the algorithm com.company.service.nqueen offered by the computing module M1 to others is still in use in the computing module M2 installed second. Thus, only the remaining parts of the first computing module M1 are removed (604). In the future, when it becomes necessary to remove the computing module M2 as well, the algorithm com.company.service.nqueen provided by the computing module M1 is also removed automatically in this context, if this algorithm is not in the use of any other computing module at that stage.

Thus, the system advantageously ensures that packages to which active references exist are not accidentally removed, which ensures undisturbed continuation of other computing processes. Thus, it is also possible to avoid reloading of the same package from the server.

The same advantage is also attained in a situation in which the aim is to test the computing module with different kinds of computing algorithms. Let us assume that at first a computing module is produced whose size is 700 kilobytes, and said computing module uses an algorithm com.company.service.nqueen, which is only 50 kilobytes in size. Both the computing module and the algorithm are loaded in several client nodes for test computing. The computing module is tested with several initial values, and the only aspect that must be changed as a result of the tests is said algorithm com.company.service.nqueen. If the entire 700 kilobytes software would be transmitted every time an algorithm is changed, the network would face considerable loading.

In the present grid computing system, excluding the algorithm, all the rest of the computing module can be reused by means of the export function, wherein a mere modified com.company.service.nqueen algorithm is transmitted from the server. The core software of the client nodes is capable of automatically utilizing once transmitted and installed computing module together with the recently transmitted algorithm com.company.service-nqueen. When compared to systems of prior art, in which programs can utilize only services of the system level, and not the services of other programs, it is possible to reduce the network loading into a fraction of what it could be.

The examples described above only illustrate the installation, updating and removal of computing modules. However, it must be noted that the core program of the intermediate software of the client nodes is also coded as a data bundle in a corresponding manner, said data bundle comprising different management packages relating to the control of computing. Thus, the core program itself can be updated one package at a time, and it may also comprise dependencies on other packages and their different versions. Thus, the examples described above also apply to the management of the core program of the intermediate software.

It should be noted that the structure of the grid network itself may be quite complex, and it may differ for instance from the example illustrated for example in FIG. 1. One structure utilizing the updating possibility presented hereinabove is a tree-structured grid network, in which the nodal point functioning as a server node of one client node cluster also functions as a client node of a larger entity. For example, client nodes (individual computers) belonging to the grid network of a certain department in a university may form one cluster, and the server node controlling the function of said cluster can correspondingly function as a client node in a grid network covering the entire university, and the server node controlling the function of this grid network can, in turn, function as a client node in a grid network covering all the universities in Finland, etc.

Figure 7:
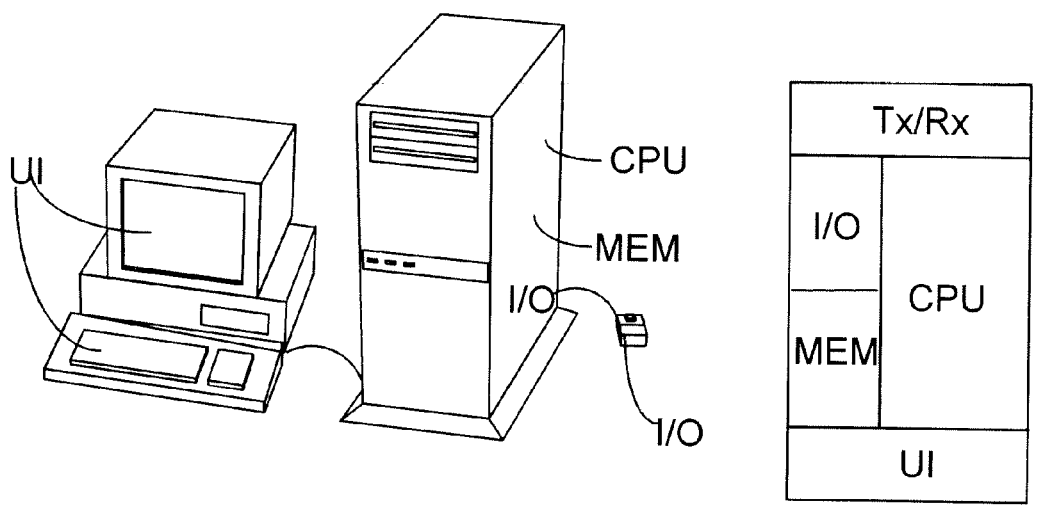
FIG. 7 shows a reduced block diagram of a nodal point of a grid computing network according to an embodiment of the disclosed embodiments.

The nodal points of the grid network, i.e. the client and server nodes are advantageously computers, servers or other data processing devices known as such that use an operating system known as such, for example the Windows™, Mac®, OS X®, Linux®, or Unix® operating system. According to FIG. 7, such a data processing device typically comprises a central processing unit (CPU), memory (MEM) and an I/O system (I/O). All the necessary information is stored in the memory (MEM) of the device. The memory (MEM) comprises a read memory portion, which can be for example a ROM memory (ROM, Read Only Memory) and a random access memory, which can be composed of a RAM memory and/or a FLASH memory. By means of the I/O system (I/O) the device communicates for example with other devices, networks and with the user. The user interface (UI) that forms a part of the I/O system (I/O) comprises an interface necessary for communicating with the user, for example a display, a keyboard, a loudspeaker and/or a microphone. The I/O system comprises especially a transmitter/receiver unit Tx/Rx, which is arranged to transmit and receive information in accordance with various data transmission protocols with other nodes of the grid network. The information obtained from the different components of the device is transmitted to the central processing unit (CPU) that comprises one or several processors and which processes the obtained information in a desired manner.

The above-described embodiments of the disclosed embodiments can be most advantageously implemented as a computer program SW, which can be loaded in the memory MEM contained in the client node, which program, when executed in the processor CPU of the client node makes the client node to implement tasks according to the disclosed embodiments. The functions of the computer program SW may be distributed in several different software components that communicate with each other. The computer program may be stored in any memory means, for example in the hard drive of a PC, or in a CD-ROM disc, from which it can be loaded in the memory MEM of the client node. The computer program can also be loaded through a network, for example by using a TCP/IP protocol stack. It is also possible to use hardware solutions or a combination of hardware and software solutions to implement the inventive means.

It is obvious for a person skilled in the art that the basic idea of the disclosed embodiments can be implemented in various ways, wherein the disclosed embodiments and its embodiments are not restricted to the examples described hereinabove, but they may vary within the scope of the appended claims.

The invention claimed is:

1. A grid computing network comprising a server computing node and several client computing nodes, of which at least one client computing node comprises a core program to manage computing modules of the at least one client computing node, wherein:

a computing module is loaded in the at least one client computing node, the computing module and the core program are coded as data bundles comprising independent packages, the independent packages being independently executable by the core program such that a single package of the computing module or the core program can be activated into other computing modules of the at least one client computing node for executing a computing task of the computing module, the server computing node is arranged configured to transmit computing data and information on at least one computing module necessary for executing the computing task of the computing module to the at least one client computing node as non-bundled data, the at least one client computing node, upon reception of the computing data and the information on the at least one necessary computing module from the server computing node, is configured to:

install the at least one necessary computing module in the at least one client computing node;

check by the at least one client computing node, from a file contained in the at least one necessary computing module, whether other components are determined as necessary components for executing a computing task of the at least one necessary computing module; and as an option, take the other components determined as necessary components for executing the computing task of the at least one necessary computing module in use from the other computing modules of the at least one client computing node or the core program of the at least one client computing node without interrupting processes of the other computing modules of the at least one client computing node, and, as another option, receive the other components determined as necessary components from another client computing node or the server computing node of the grid computing network.

2. The grid computing network according to claim 1, wherein the server computing node is further configured to transmit the information on the at least one necessary computing module together with the computing data.

3. The grid computing network according to claim 1, wherein the server computing node is further configured to transmit the information on the at least one necessary computing module separately from the computing data, and wherein the information on the at least one necessary computing module includes identification data of the computing data.

4. The grid computing network according to claim 1, wherein a data bundle forming the computing module comprises a file that determines other components necessary for executing the computing task of the at least one necessary computing module.

5. A method for managing a grid computing network, wherein the grid computing network comprises a server computing node and several client computing nodes, of which at least one client computing node comprises a core program for managing computing modules of the at least one client computing node, the method comprising:

loading a computing module in the at least one client computing node, wherein the computing module and the core program are coded as data bundles comprising independent packages, and wherein the independent packages are independently executable by the core program such that a single package of the computing module or the core program can be activated into other computing modules of the at least one client computing node for executing a computing task of the computing module;

receiving, by the at least one client computing node, computing data and information on at least one computing module necessary for executing the computing task of the computing module from the server computing node as non-bundled data;

in response to receiving the computing data and the information on the at least one necessary computing module by the at least one client computing node, installing the at least one necessary computing module in the at least one client computing node;

checking by the at least one client computing node, from a file contained in the at least one necessary computing module, whether other components are determined as necessary components for executing a computing task of the at least one necessary computing module; and as an option, taking the other components determined as necessary components for executing the computing task of the at least one necessary computing module in use from the other computing modules of the at least one client computing node or the core program of the at least one client computing node without interrupting processes of the other computing modules of the at least one client computing node, and as another option, receiving the other components determined as necessary components from another client computing node or the server computing node of the grid computing network.

6. The method according to claim 5, further comprising receiving the information on the at least one necessary computing module together with the computing data.

7. The method according to claim 5, further comprising receiving the information on the at least one necessary computing module separately from the computing data, wherein the information on the at least one necessary computing module includes identification data of the computing data.

8. The method according to claim 5, further comprising updating the at least one necessary computing module in the at least one client computing node.

9. The method according to claim 5, further comprising:

checking, from the file contained in the at least one necessary computing module, version data of the other components determined as necessary components for executing the computing task of the at least one necessary computing module; and updating the other components determined as necessary components from the other computing modules of the at least one client computing node to correspond to the version data of the other components determined as necessary components for executing the computing task of the at least one necessary computing module.

10. The method according to claim 5, further comprising offering at least one package from the at least one necessary computing module to be taken in use by the other computing modules of the at least one client computing node.

11. The method according to claim 10, wherein installation of the at least one necessary computing module is removed from the at least one client computing node in such a manner that dependencies of the at least one package offered to the other computing modules of the at least one client computing node to be taken in use by the other computing modules of the at least one client computing node are checked, and in response to checking the dependencies of the at least one package offered to the other computing modules of the at least one client computing node to be taken in use by the other computing modules of the at least one client computing node, only the independent packages are removed from the at least one necessary computing module.

12. A client computing node of a grid computing network comprising:
- a central processing unit; and
- a memory, coupled to the central processing unit, storing:
  - a core program operable to manage computing modules of the client computing node;
  - a computer program code operable to load a computing module in the client computing node, wherein the computing module and the core program are coded as data bundles comprising independent packages, and wherein the independent packages are independently executable by the core program such that a single package of the computing module or the core program can be activated into other computing modules of the client computing node for executing a computing task of the computing module; and
  - a computer program code operable to receive computing data and information on at least one computing module necessary for executing the computing task of the computing module from a server computing node as non-bundled data, wherein the client computing node, upon reception of the computing data and the information on the at least one necessary computing module from the server computing node, is configured to:
    - install the at least one necessary computing module in the client computing node;
    - check by the client computing node, from a file contained in the at least one necessary computing module, whether other components are determined as necessary components for executing a computing task of the at least one necessary computing module; and
    - as an option, take the other components determined as necessary components for executing the computing task of the at least one necessary computing module in use from the other computing modules of the client computing node or the core program of the client computing node without interrupting processes of the other computing modules of the at least one client computing node, and as another option, receive the other components determined as necessary components from another client computing node or the server computing node of the grid computing network.

13. A non-transitory computer-readable medium, comprising a computer program stored thereon and executable by a client computing node, for managing computing modules of the client computing node in a grid computing network, the computer program comprising:
- a software code portion operable to load a computing module in the client computing node, wherein the computing module and the computer program are coded as data bundles comprising independent packages, and wherein the computing module is independently executable by the computer program such that a single package of the computing module or the computer program can be activated into other computing modules of the client computing node for executing a computing task of the computing module;
- a software code portion operable to receive computing data and information on at least one computing module necessary for executing the computing task of the computing module from a server computing node as non-bundled data;
- a software code portion, responsive to receiving the computing data and the information on the at least one necessary computing module by the client computing node, operable to install the at least one necessary computing module in the client computing node;
- a software code portion operable to check by the client computing node, from a file contained in the at least one necessary computing module, whether other components are determined as necessary components for executing a computing task of the at least one necessary computing module; and
- a software code portion operable to, as an option, take the other components determined as necessary components for executing the computing task of the at least one necessary computing module in use from the other computing modules of the client computing node or the computer program of the client computing node without interrupting processes of the other computing modules of the at least one client computing node, and, as another option, receive the other components determined as necessary components from another client computing node or the server computing node of the grid computing network.

\* \* \* \* \*